United States Patent [19]
Harris et al.

[11] Patent Number: 5,902,473
[45] Date of Patent: May 11, 1999

[54] CATHODIC ELECTRODEPOSITION COATING WITH CARBAMATE-FUNCTIONAL CROSSLINKING AGENTS

[75] Inventors: Paul J. Harris, West Bloomfield, Mich.; Peter D. Clark, Yokohama, Japan; Timothy S. December, Rochester Hills, Mich.

[73] Assignee: BASF Corporation, Southfield, Mich.

[21] Appl. No.: 08/885,442

[22] Filed: Jun. 30, 1997

[51] Int. Cl.[6] .............................. C25D 5/48; C25D 13/00; C25D 15/00
[52] U.S. Cl. ......................... 205/229; 204/501; 204/504; 204/507; 204/509
[58] Field of Search .................................... 204/501, 504, 204/507, 509; 205/229

[56] References Cited

U.S. PATENT DOCUMENTS

| | | | |
|---|---|---|---|
| 4,435,559 | 3/1984 | Valko | 528/73 |
| 4,484,994 | 11/1984 | Jacobs, III et al. | 204/181 |
| 4,528,363 | 7/1985 | Tominaga | 528/370 |
| 4,542,173 | 9/1985 | Schupp et al. | 523/414 |
| 4,543,376 | 9/1985 | Schupp et al. | 523/414 |
| 4,588,798 | 5/1986 | Heitner | 526/228 |
| 4,720,569 | 1/1988 | Tominaga | 560/26 |
| 4,808,658 | 2/1989 | Walz et al. | 524/591 |
| 4,888,055 | 12/1989 | Walz | 106/1.05 |
| 4,897,435 | 1/1990 | Jacobs, III et al. | 523/414 |
| 5,057,559 | 10/1991 | Paar et al. | 523/414 |
| 5,658,970 | 8/1997 | Harris et al. | 523/414 |

*Primary Examiner*—Kathryn L. Gorgos
*Assistant Examiner*—Edna Wong
*Attorney, Agent, or Firm*—Anne Gerry Sabourin

[57] ABSTRACT

An electrodeposition process using an aqueous coating composition comprising a carbamate-functional crosslinking agent and at least one principal resin is described. The carbamate-functional crosslinker is formed by first reacting a polyamine having at least two primary amine groups and at least one secondary amine group with a cyclic carbonate, and then reacting the product of the first reaction with a polyepoxide compound.

27 Claims, No Drawings

CATHODIC ELECTRODEPOSITION COATING WITH CARBAMATE-FUNCTIONAL CROSSLINKING AGENTS

FIELD OF THE INVENTION

The present invention relates to cathodic electrodeposition compositions and coating methods and particularly to the use of carbamate-functional crosslinking agents in such methods.

BACKGROUND OF THE INVENTION

Electrocoating, or electrodeposition coating, is a means of applying a coating to a conductive article or workpiece. In the electrocoating process, the conductive article that is to be coated is used as one electrode in an electrochemical cell. The article is submerged in an aqueous dispersion of the coating composition, which contains a charged, preferably a cationic, resin. The resin is deposited onto the article by applying an electrical potential between the article and a second electrode. The coating deposits onto the article until it forms an insulating layer on the article that essentially prevents more current from being passed.

The electrocoating process is particularly suited to applying a continuous and uniform protective primer layer to an article or workpiece that has complex shape or construction. When the surfaces of the article closest to the other electrode have been coated and insulated, the current deposits the coating onto recessed areas and other less accessible areas until an insulating coating layer is formed on all conductive surfaces of the article or workpiece, regardless of how irregularly shaped the article is.

Electrocoat processes, particularly for coating automotive bodies and parts, usually employ a thermosetting coating composition comprising a cationic principal resin and a polyfunctional oligomeric or monomeric crosslinking agent that is capable of reacting with the principal resin under curing conditions. The crosslinking agent is associated with the principal resin in the dispersion and is deposited along with the principal resin onto the article or workpiece. After deposition, the deposited coating may be cured to a crosslinked, durable coating layer.

Although other crosslinking agents, such as aminoplast resins, have been used, polyisocyanate crosslinking agents are predominantly used and preferred in automotive electrocoat applications, in which the workpieces are, for example, vehicle bodies, wheel rims, and other metal parts. The polyisocyanate crosslinking agents react with hydroxyl groups on the principal resin to form urethane linkages, or with primary or secondary amine groups on the principal resin to form urea linkages. Urethane and urea linkages are preferred in automotive and other applications because of the durability and hydrolytic stability of such linkages.

There are, however, a number of disadvantages in using polyisocyanate crosslinking agents. One such disadvantage is that, in order to prevent the reaction of the isocyanate groups of the crosslinking agent with water in the dispersion, or the premature reaction with the principal resin, the isocyanate groups must be reversibly blocked before the crosslinking agent is added to the coating composition. Besides the time and expense of the extra blocking step, high temperatures (usually 150° C. or more) are required to reverse the blocking reaction and regenerate the isocyanate groups before they can react to crosslink the principal resin. Moreover, the volatile blocking agents released during this reversal can cause deleterious effects on coating properties, as well as increasing undesirable air emissions from the process. Another drawback is that the toxicity of monomeric isocyanates, particularly aromatic isocyanates, requires special handling procedures during manufacture of the blocked polyisocyanate crosslinking agents. Additionally, aromatic isocyanates have been associated with film yellowing.

It would be desirable to have a method of forming the durable urethane and urea linkages during the cure of the electrocoat film without the attendant problems of blocked polyisocyanate curing agents. We have now discovered an improved method for producing durable, crosslinked electrocoat films.

SUMMARY OF THE INVENTION

The process of our invention provides for electrically depositing a coating onto a conductive article or workpiece immersed in an aqueous coating composition, removing the coated article or workpiece from the coating composition, and curing the deposited coating to form a crosslinked film. The aqueous coating compositions used in the electrodeposition processes of the present invention comprise a carbamate-functional crosslinking agent and at least one principal resin that has groups reactive with carbamate functionality. The principal resin has a plurality of acid-salted amine groups.

The carbamate-functional crosslinking agent of the invention is formed by first reacting a polyamine having at least two primary amine groups and at least one secondary amine group with a cyclic carbonate, and then reacting the product of the first reaction with a polyepoxide compound.

In a further aspect, our invention provides a coated article produced according to the process just described.

DETAILED DESCRIPTION

The processes of our invention use an aqueous coating composition comprising a carbamate-functional crosslinking agent and at least one principal resin. The carbamate-functional crosslinking agent may be prepared by a two-step process. In the first step, a polyamine with at least two primary amine groups is reacted with a cyclic carbonate to form a first product. Besides at least two primary amine groups, the polyamine also has at least one group reactive with epoxide functionality but unreactive toward a cyclic carbonate. The group or groups reactive with oxirane functionality may be selected, for example, from secondary amine groups, carboxylic acid groups, phenolic OH groups, and mixtures thereof. The primary amines react with the cyclic carbonate to generate carbamate groups, and the group or groups reactive with oxirane functionality remain unreacted. In the second step, the first product is reacted with a polyepoxide compound to form the carbamate-functional crosslinking agent. The epoxide groups of the polyepoxide compound react with the epoxide reactive group or groups of the first product to form a crosslinking agent with a plurality of carbamate groups. Preferably, the first product has from 1 to about 3, more preferably one or two, and particularly preferably one group reactive with an epoxide group.

Polyamines suitable for use in the first reaction have at least two primary amine groups and at least one other group, such as a secondary amine group, that is reactive with an epoxide group. In one preferred embodiment, the polyamine is a polyalkylene polyamine or a mixture of polyalkylene polyamines. Amino acids or phenolic amines having at least two primary amines are also suitable. Examples of suitable polyalkylene polyamines are diethylenetriamine, triethylenetetramine, tetraethylenepentamine, dipropylenetriamine, and mixtures thereof. Particularly preferred among these are diethylenetriamine, dipropylenetriamine, and mixtures of these compounds. Preferred polyamines have molecular weights in the range of about 75 to about 400, more preferably from about 75 to about 250, and still more preferably from about 100 to about 160.

Suitable cyclic carbonates for use in preparing the crosslinking agents of the processes of the present invention are of various ring sizes known in the chemical art, such as five-member, six-member, and seven-member cyclic carbonate rings, as well as fused ring systems containing the characteristic —O—CO—O— carbonate moiety. These cyclic carbonate compounds can be synthesized by any of several reaction schemes known in the art, for example, by those disclosed in U.S. Pat. No. 5,431,791, incorporated herein by reference. One method of obtaining five-member cyclic carbonates is to react an epoxide group with carbon dioxide under pressure of from atmospheric up to super-critical $CO_2$ pressures, preferably from about 60 to about 150 psi, and at temperatures typically from about room temperature up to about 200° C., preferably from about 60 to about 150° C. A catalyst may be employed. Useful catalysts include any that activate an oxirane ring, such as tertiary amine or quaternary amine salts, including tetramethylammonium bromide; combinations of complex organotin halides and alkyl phosphonium halides, such as $(CH_3)_3SnI$, $Bu_3SnI$, $Bu_4PI$, and $(CH_3)_4PI$; potassium salts such as potassium carbonate and potassium iodide, preferably in combination with crown ethers, tin octoate, or calcium octoate; and the like.

Five-member carbonate rings are preferred due to their ease of synthesis and their ready-availability commercially. Examples of preferred cyclic carbonates include ethylene carbonate and propylene carbonate. Ethylene carbonate and propylene carbonate are commercially available. Monofunctional carbonates are used to avoid gellation during synthesis of the carbamate-functional crosslinking agents.

The cyclic carbonate compound and the polyamine compound may be reacted together in a ratio of about one equivalent of carbonate to one equivalent of primary amine. A solvent that is inert toward the reaction may be added to the reaction mixture, if desired. Suitable solvents include alcohols and esters. The reaction between primary amine and cyclic carbonate is carried out at temperatures of from about 0 to about 100° C., preferably at from room temperature to about 30° C. The reaction may be carried out for about 3 to about 5 hours. The progress of the reaction can be monitored by disappearance of the carbonate group or by titration of the amine. The reaction may also be monitored by titration of amine groups.

The carbamate-functional first product is reacted via the residual secondary amine, carboxylic acid, or phenolic hydroxyl group or groups with a polyepoxide compound to form the carbamate-functional crosslinking agent. The polyepoxide compound may be any aliphatic or aromatic compound having at least two epoxide groups, and it is preferred to employ compounds that have from about 2 to about 4 epoxide groups per molecule on average. Examples of useful polyepoxide compounds include, without limitation, polyglycidyl ethers and esters, epoxy novolac resins, and epoxide-functional acrylics. In particular, the polyepoxide compound may be the polyglycidyl ether of aliphatic or aromatic polyols such as 1,4-butanediol, neopentyl glycol, cyclohexane dimethanol, diethylene glycol, polyethylene glycol, dipropylene glycol, polypropylene glycol, 2,2,4-trimethyl-1,3-pentanediol, 1,6-hexanediol, trimethylolpropane, trimethylolethane, glycerol, bisphenol A (4,4'-isopropylidenediphenol), hydroquinone, 4,4'-biphenol, 2,2'-biphenol, 4,4'-dihydroxybenzophenone, 1,5-dihydroxynaphthylene, novolac polyphenols, resorcinol, and similar compounds. In principle, the glycidyl ether of any polyol can be used. The polyepoxide compound is preferably a polyglycidyl ether of a polyphenol, and particularly preferably, it is the diglycidyl ether of bisphenol A. The polyepoxide compound could also be extended, for example by reaction of the diglycidyl ether of bisphenol A with a polyphenol such as bisphenol or with a polyamine such as those sold under the tradename Jeffamine® by Huntsman Co. of Houston, Tex.

The novolac epoxy resin may be epoxy phenol novolac resins or epoxy cresol novolac resins having the formula I:

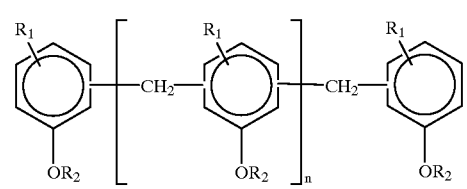

(I)

in which $R_1$ is H or methyl, $R_2$ may be H or a glycidyl group, with the proviso that on average at least two $R_2$ groups per molecule are glycidyl groups and preferably from two to four $R_2$ groups per molecule are glycidyl groups, and n is from 0 to 12, preferably from 1 to 6, and more preferably from 1 to 2. The novolac resin may also be an aromatic novolac bisphenol A resin, having either the formula II (II)

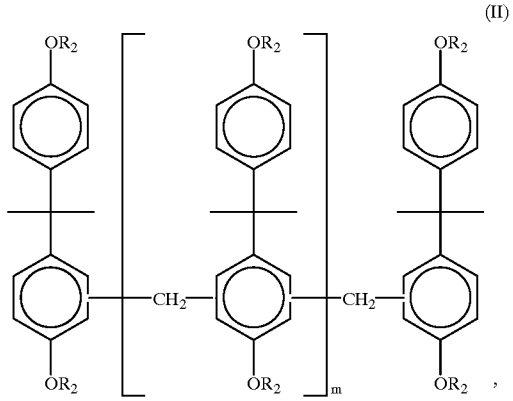

or the formula III

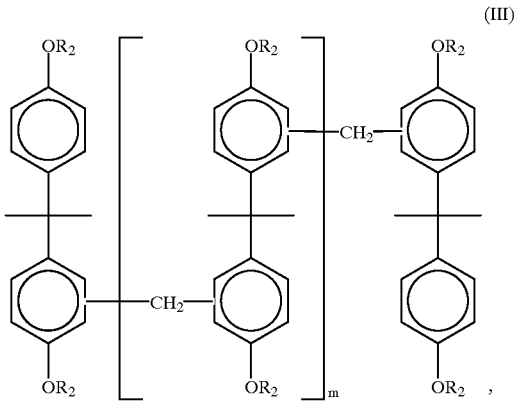

wherein, for each formula, $R_2$ may be H or a glycidyl group, with the proviso that on average at least two $R_2$ groups per molecule are glycidyl groups, and m is from 0 to 4, preferably from 0 to 2.

Polyglycidyl esters of polyacids are also useful in the present invention. Preferably, the polyglycidyl ester is the ester of a compound having two to about four carboxylic acid groups. Such esters include, without limitation, the diglycidyl esters of terephthalic acid, succinic acid, glutaric acid, 2,6-naphthylene dicarboxylic acid, and oxalic acid.

The range of useful epoxide equivalent weights for the polyepoxide compounds is broad, but in general it is preferred that the epoxide equivalent weight should be chosen to yield a sufficient crosslink density on curing to make a film that is strong and durable. In one preferred embodiment, the epoxide equivalent weight is from about 50 to about 500.

The reaction between the carbamate-functional first product and the polyepoxide compound is carried out under conditions typical for such reactions. For example, the reaction between a secondary amine group and a polyepoxide compound may be carried out at temperatures of from about 50° C. to about 100° C. This reaction may be followed by titration for epoxide groups. The reaction between a phenolic compound and a polyepoxide compound may be carried out at temperatures of from about 120° C. and about 180° C., optionally with a catalyst such as triphenylphosphine or dimethylbenzylamine. This reaction may be followed by titration for acid. The reaction between a carboxylic acid group and a polyepoxide compound may be carried out at temperatures of from about 100° C. and about 120° C. This reaction may be followed by titration for acid. The reaction mixture may optionally include a solvent, for example an aromatic solvent such as xylene, toluene, or Aromatic 100.

The polyamine and the polyepoxide are chosen so that the carbamate-functional crosslinking agent formed from them has from about 4 to about 8, and preferably from about 4 to about 6, and even more preferably about 4 carbamate groups.

The carbamate-functional crosslinking agent is incorporated into an aqueous coating composition comprising at least one principal resin. The principal resin has at least two carbamate-reactive moieties that will react with the carbamate groups of the crosslinking agent during cure to form a crosslinked network. For example, the principal resin may have groups selected from primary amine, secondary amine, or hydroxyl groups. The hydroxyl groups may be those that result from the reaction of the epoxy groups during synthesis of the principal resin. The principal resin can be any conventional electrocoat principal resin that has primary or secondary amine groups. The primary or secondary amine groups may also be used in dispersing the principal resin and may be near the ends of the resin molecules or along the backbone, as discussed below.

The principal resin according to the invention has a plurality of amine groups. The amine groups are salted with acid in order to form a stable, cationic dispersion of the ingredients in the aqueous coating composition. The amine groups that are salted may be tertiary amine groups. The principal resins of the invention may have pendant amine groups located randomly along the backbone, as in the case of an acrylic principal resin.

Syntheses of typical principal resins are described, for example, in U.S. Pat. Nos. 4,661,541; 4,780,524; 4,857,567; 5,021,470; 5,194,560; and 5,348,635, the disclosures of each of which is incorporated herein by reference. Preferably, the principal resins used in the inventive processes are synthesized by capping with an amine compounds any of the kinds of resins known to be useful in electrocoat processes, for example, acrylic, epoxy, polyester, polyurethane, polyether, or epoxy-modified rubber polymers. Usually, the principal resin is synthesized by capping an epoxide-functional polymer of the kind mentioned with a polyamine. The principal resin is preferably an epoxy resin having an epoxide equivalent weight of from about 900 to about 4000. In a particularly preferred embodiment, the principal resin comprises the epoxide-functional product of a polyglycidyl ether of a polyphenol extended with an extender selected from the group consisting of polyphenols, polyamines, and ethoxylated polyamines, and mixture thereof.

For example, the principal resin can be the reaction product of an epoxy resin and a polyamine compound having a secondary amine group and at least one latent primary amine group blocked by a ketimine. In a preferred synthesis, the primary amine group or groups are blocked with the ketimine first, and then a secondary amine group or groups are reacted with the epoxy groups of the epoxy resin. It is preferred that enough equivalents of the secondary amine group are employed in the capping step to consume substantially all of the epoxide groups. The polyamine used for capping the epoxide-functional resin to produce the principal resin preferably has at least one secondary amine group and at least two latent primary amine groups blocked by ketimine or aldehyde. Examples of especially preferred polyamine compounds include ketimine-blocked diethylenetriamine and ketimine-blocked triethylenetetramine.

After blocking the primary amine group or groups of the polyamine compound, the remaining epoxide-reactive group, for example a secondary amine, carboxylic acid, or phenolic group, is reacted with the epoxide-functional resin under appropriate conditions, optionally with a catalyst such as an amine or phosphine compound. For example, a secondary amine is reacted with the epoxide groups of a bisphenol A-extended diglycidyl ether of biphenol A at temperatures of from about 65 to 150° C. for from 30 minutes to four hours. When the principal resin is dispersed in water, the ketimine-blocking reaction is reversed and the primary amine groups are regenerated.

The amount of crosslinking agent used based upon total solid resin in the coating compositions of the invention is at least about 10% and up to about 65% by weight based upon total weight of nonvolatile resin, more preferably at least about 15 and up to about 45% by weight nonvolatile resin, and still more preferably at least about 25 and up to about 40% by weight nonvolatile resin. By total solid resin or nonvolatile resin, we mean the total of all resinous materials, including principal resin, crosslinkers, plasticizers, and other such organic resinous materials. In a particularly preferred embodiment, the crosslinking agent is used at an amount of at least about 30% and up to about 35% by weight of resin solids. Preferably, there is a slight excess of equivalents of crosslinking agent.

In a preferred embodiment, the crosslinking agent comprises not only the carbamate-functional crosslinker described above, but also an aliphatic urea crosslinker. The crosslinking agent preferably comprises at least about 25%, and up to about 75%, of the aliphatic urea crosslinker by weight. It is particularly preferable to use approximately equal amounts by weight of the aliphatic urea crosslinker and the carbamate-functional crosslinker as the crosslinking agent.

The aliphatic urea crosslinker of the invention is the reaction product of an aliphatic polyisocyanate with an aliphatic secondary amine. Preferably, the polyisocyanate is an aliphatic polyisocyanate. Examples of useful aliphatic polyisocyanates include, without limitation, isocyanurates of aliphatic diisocyanates such as hexamethylene diisocyanate and isophorone diisocyanate, as well as reaction products of 3 moles of aliphatic diisocyanates with one mole of aliphatic triols such as the reaction product of 3 moles of hexamethylene diisocyanate with 1 mole of trimethylolpropane. The aliphatic secondary amine is preferably a dialkyl secondary amine of the formula RR'NH, with R and R' being independently selected from alkyl groups, especially alkyl groups of 1 to 12 carbon atoms. Examples of useful aliphatic amines include, without limitation, dibutylamine, methylbutylamine, dipropylamine, ethylpropylamine, N-methylcyclohexylamine, and so on. While the alkyl groups may have substituents not reactive with isocyanate, substituted alkyl groups are not preferred. The reaction between the aliphatic polyisocyanate and the aliphatic secondary amine usually takes place at mild temperatures. A suitable catalyst may be employed. The reaction is usually carried out using a ratio of 1 equivalent of isocyanate to from about 1 equivalent of secondary amine.

The crosslinking agent and the principal resin are usually mixed together before dispersing. The dispersion is formed and stabilized by salting the amine groups of the principal resin with one or more acids. The crosslinking agent and principal resin mixture is uniformly dispersed in an aqueous medium with an acid in an amount sufficient to neutralize enough of the ionic groups to impart water-dispersibility to the resin. The acid may either be mixed with the resin before the resin is introduced into the water, or it may be mixed with the water with the resin being introduced into the acidified water. Examples of acids that may be used to neutralize the ionic groups include, without limitation, phosphoric acid, acetic acid, propionic acid, lactic acid, and mixtures of these acids.

The cationic principal resin is at least partially neutralized in the dispersion. The cationic principal resin may be fully neutralized; however, partial neutralization is usually sufficient to impart the required water-dispersibility and stability of the dispersion. By "partial neutralization" we mean that at least one, but less than all, of the amine groups on the resin are neutralized. By saying that the resin is at least partially neutralized, we mean that at least one amine group is neutralized, and up to all amine groups may be neutralized. The degree of neutralization that is required to obtain the requisite water-dispersibility for a particular resin will depend upon its chemical composition, level of cosolvent, and other factors, and can readily be determined by one of ordinary skill in the art through straightforward experimentation. Typically, the amine groups are 30–70% neutralized. Preferably, the amine groups are at least 45% neutralized, and up to 55% neutralized.

The electrocoat compositions of the present invention preferably include one or more pigments. Pigments are included in the composition for decorative effect and also, in the common situation when the electrocoat composition is used as a primer, to enhance the corrosion protection properties of the coating. Pigments may be present in the composition in amounts up to about 35% by weight, based on total weight of the nonvolatile components in the coating composition. Preferably, the coating compositions contain from about 15% to about 25% pigment, based on the total weight of nonvolatiles. Typical inorganic pigments include metal oxides, chromates, molybdates, phosphates, and silicates. The compositions often include carbon and/or various organic pigments for coloring and other purposes. Some pigments that are useful in the electrocoat coating compositions of the invention include titanium dioxide, barium sulfate, aluminum phosphomolybdate, carbon black, red iron oxide, strontium chromate, lead chromate, lead oxide, zinc phosphate, talc, barytes, lead molybdate, basic lead silicate, quinacridones, and phthalocyanines. When the coating is applied as a primer, the pigments may include carbon black, titanium dioxide, extender pigments such as clay and barytes, and anti-corrosion pigments such as lead compounds.

The pigments are usually first dispersed in a pigment paste by grinding the pigments to a certain fineness in a medium that typically includes one or more resins or polymeric dispersants, along with organic solvents and/or water. The grinding serves the purposes of breaking apart the agglomerated particles in the dry pigment and closely associating the pigment particles with the grinding resin or dispersant compound. The maximum particle size in the pigment paste after grinding is preferably between about 0.1 micron and about 10 microns. The grinding may be done using methods and equipment known to the art. A basic discussion is provided in Federation Series on Coatings Technology, Unit Sixteen: Dispersion and Grinding (publ. by Federation of Societies for Paint Technology, Philadelphia, Pa., 1970), incorporated herein by reference.

The pigment-to-resin ratio in the pigment paste is preferably less than about 1:2 and is more preferably between about 1:5 and about 1:3. When a dispersant compound is used, such as the one described in U.S. Pat. Nos. 5,536,776 and 5,527,614, the ratio of pigment-to-dispersant is typically between 2:1 and 40:1.

The resin dispersion is usually made at 15 to 45 percent nonvolatiles, and preferably from 25 to 40 percent nonvolatiles. The resin dispersion and the pigment dispersion are mixed together and often further diluted with deionized water, to form the electrocoat bath. The electrocoat bath is usually 15 to 40 percent nonvolatile, preferably from 15 to 25 percent nonvolatile. The average particle size diameter of the resinous phase is about 0.1 to 10 microns, preferably less than 5 microns.

The ratio of pigment to binder, which includes the principal resin, crosslinking agent, grinding resin or dispersant, and any additional resins that may be in the composition, can vary widely, depending upon the pigments used and the desired properties of the finished film. For example, a black film may be deposited using 0.5 parts of carbon black to 99.5 parts of binder, while a white film may be plated using 50 parts of titanium dioxide to 50 parts of binder. Usually, the pigment is 10 to 40 percent of the nonvolatile material in the bath. Preferably, the pigment is 15 to 30 percent of the nonvolatile material in the bath.

The aqueous coating compositions used in the processes of the present invention may contain organic solvents and preferably include one or more organic solvents that function as cosolvents. The cosolvents aid in dispersing and stabilizing the ingredients in the electrocoat coating compositions and also may help to coalesce the film and/or improve flow during cure to help form a smooth coating. Useful cosolvents include, without limitation, alcohols, esters, ethers, and ketones. The preferred cosolvents include, without limitation, alcohols, ethers, and esters. Specifically preferred cosolvents include monopropyl, monobutyl, and monohexyl ethers of ethylene or propylene glycol; dimethyl, diethyl, and dipropyl ethers of ethylene or propylene glycol; and diacetone alcohol. A small amount of a water-immiscible organic solvent such as xylene, toluene, methyl isobutyl ketone, or 2-ethylhexanol may be present, also. The amount of organic solvent, including cosolvent and water-immiscible solvent, is generally between about 0 to 15 percent by weight, preferably about 0.5 to 5 percent by weight based on total weight of the resin solids.

It will be appreciated that the aqueous coating compositions used in the processes of the invention can contain optional ingredients, including those well-known in the art, such as dyes, flow control agents, catalysts, wetting agents, plasticizers, surfactants, UV absorbers, hindered amine or amide light stabilizers, antioxidants, defoamers, and so forth. Such materials are readily available commercially, and the levels and methods of incorporation are well-known to the skilled artisan. Examples of surfactants and wetting agents include, without limitation, alkyl imidazolines such as those available from Ciba-Geigy Industrial Chemicals as Amine C® and acetylenic alcohols such as those available from Air Products and Chemicals under the tradename Surfynol®. Surfactants and wetting agents, when present, typically amount to up to 2 percent by weight, based on vehicle solids. Plasticizers are optionally included to promote flow. Examples of useful plasticizers are high boiling, water-immiscible materials such as ethylene or propylene oxide adducts of nonyl phenols or of bisphenol A. Plasticizers can be used at levels of up to 15 percent by weight resin solids. Curing catalysts such as lead, iron, zinc, manganese, and tin catalysts can be used in the coating composition. Examples are dibutyltin dilaurate and dibutyltin oxide. When used, they are typically present in amounts of about 0.05 to 2 percent by weight tin based on weight of total resin solids.

The electrocoat bath should have an electroconductivity from 800 micromhos to 3000 micromhos. When conductivity is too low, it is difficult to obtain a film of desired thickness and having the desired properties. On the other hand, if the composition is too conductive, problems such as the dissolution of the deposited film, uneven film thickness, rupturing of the film, or poor resistance of the film to corrosion or water spotting may result.

In using the electrocoat coating compositions according to the processes of the invention, a conductive article or workpiece is immersed in the aqueous coating composition and is employed as the cathode of the electrodeposition cell. The article or workpiece that is coated may be made of steel, copper, aluminum, or other metals or metal alloys. The article coated with the electrocoat coating compositions according to the processes of the invention may be a metallic automotive part or body.

A current is passed through the coating composition to deposit a coating onto the conductive surfaces of the article. The current is continued for a desired time, usually until an essentially insulating coating layer has been deposited on all surfaces accessible to the current. Typically, the applied voltage is between 50 volts and 500 volts, with an initial current density of 1.0 to 1.5 amperes, which drops to essentially nil, usually less than about 0.2 amperes as the coating layer is deposited. The voltage is usually applied for about 1 to about 5 minutes, and typically for two minutes in automotive applications.

After deposition of the coating, the coated article is removed from the coating composition and, preferably, rinsed with deionized water to remove the bath that adheres to it. The deposited dry film thickness may be tailored to meet the needs of the coated article; however, commonly desired thicknesses are usually from about 10 to about 35 microns, preferably from about 25 microns to about 30 microns (or about 1.0 to about 1.2 mils). The deposited coating is cured to form a crosslinked film by baking the coated article at a temperature of from about 300 to about 400° C., and preferably at from about 350 to about 375° C., for a period of time, usually from about 15 to about 60 minutes, and typically for about 30 minutes.

After the film is cured, additional coatings, if desired, may be applied over the electrocoat layer. When the electrocoat layer is used as a primer in automotive applications, one or more additional coating layers, such as primer-surfacer, color coat, and clearcoat layers, may be applied over the electrocoat layer. The color coat may also be a topcoat enamel. However, in the automotive industry, the color coat is often a basecoat that is overcoated with a clearcoat layer. The primer-surfacer, topcoat enamel, basecoat, and clearcoat may each be either waterborne, solventborne, or powder coatings. The additional coatings can be formulated and applied in a number of different ways known in the art. Usually, such coatings are thermoset compositions.

The invention is further described in the following examples. The examples are merely illustrative and do not in any way limit the scope of the invention as described and claimed. All parts are by weight unless otherwise noted.

EXAMPLES

Example 1

Carbamate-Functional Crosslinker

A steel reactor equipped with an oil jacket, a condenser, an addition funnel, a stirrer, and a thermocouple was charged with 870 grams of propylene carbonate. The addition funnel was charged with 438.8 grams of diethylenetriamine. The diethylenetriamine was added over a 30-minute period with an exotherm peak of about 70° C. The addition funnel was washed with 15 grams of isobutanol, which was then added to the reaction mixture. The reaction mixture was heated to 75° C. and held at about that temperature for about an hour and a half, until a sample analyzed by infrared spectroscopy indicated that the reaction was complete. The amine equivalent weight was titrated as 307.

Next, 801 grams of diglycidyl ether of bisphenol A resin (GY2600, available from Ciba Geigy, Hawthorne, N.Y.) was added in three parts (225 grams initially, 275 grams 20 minutes later, 301 grams after another 15 minutes) with a peak exotherm temperature of 100° C. After the final addition of epoxy resin, the reaction mixture was heated and held at about 100° C. 200 grams of isobutanol were added. Titration of epoxy equivalent weight indicated that the reaction was complete after 1 hour, 40 minutes. An additional 500 grams of isobutanol were added and the product was cooled and removed from the reactor.

Example 2

Aliphatic Urea Crosslinker

A reactor equipped with a condenser, stirrer, addition funnel, and thermocouple is charged with 53.6 parts by weight aliphatic polyisocyanate (Desmodur N-3390 from Bayer) and 8.6 parts by weight of methyl isobutyl ketone. The reaction is carried out under a blanket of nitrogen. A mixture of 30 parts by weight dibutylamine and 0.5 parts by weight methyl isobutyl ketone is added to the contents of the reactor with stirring. During the addition, cooling is added if necessary to keep the temperature at about 70–75° C. The addition funnel is flushed with about 0.4 parts by weight methyl isobutyl ketone, which is then added to the reactor. The temperature of the reaction mixture is maintained for about 30 minutes, and then a mixture of 1.5 parts by weight dibutylamine and 0.9 parts by weight methyl isobutyl ketone is added. The temperature of the reaction mixture is maintained for another 30 minutes. Then, 3 parts by weight of butanol is added to the reactor and the temperature is maintained at about 70° C. for an hour. The product is cooled and adjusted to 80% nonvolatiles with 1.2 parts methyl isobutyl ketone.

Example 3

Preparation of Cathodic Electrocoat

A vessel equipped with a mixing blade driven by an air mixer was charged with 935 grams of a principal resin (the reaction product of the diglycidyl ether of bisphenol A, bisphenol A, and dodecyl phenol, WPE=1050, capped with diethanolamine and dimethylaminopropylamine) at 60° C. Next, 233 grams of the carbamate-functional crosslinker of Example 1, 224 grams of the urea crosslinker of Example 2, and 90 grams of a plasticizer resin were added. The mixture was stirred for 30 minutes. The mixture was neutralized to a theoretical 50% level with 36 grams of lactic acid. The acidified mixture was blended for 30 minutes and then 514 grams of deionized water was added and followed by an additional 30 minutes of mixing. The final emulsion was formed by adding portions of deionized water with good mixing to reduce the solid content to 26%. The emulsion was stirred in an open container for 7 days to allow evaporation of organic solvents. The emulsion was then blended with 10% by weight of an emulsion of a flexible resin prepared according to U.S. Pat. No. 5,298,538. The final emulsion had a 26% nonvolatile content; a particle size of 0.44 microns as measured by the CAPA sedimentation method or 286 nm as measured by the MALVERN light scattering method; a measured acid content of 0.211 meq acid; a measured base content of 0.858 base; and a neutralization ratio of acid to base of 0.246.

The emulsion was pigmented with a standard electrocoat pigment paste (containing titanium dioxide, carbon, barium sulfate, and lead oxide). A phosphated steel panel was plated in the bath at 125 volts for 2 minutes. The plated panel was baked for 26 minutes at 400° F. The coating film was 0.8 mil thick. The corrosion resistance was tested, with a scribe creep of 5.7 mm after 25 cycles. A 1200 ml shot test showed 6.75% paint loss.

We claim:

1. A process for coating an article by electrodeposition, comprising the steps of:
   (a) reacting a polyamine having at least two primary amine groups and at least one additional epoxide-reactive group with a cyclic carbonate to form a product of step (a);
   (b) reacting the product with a polyepoxide compound to form a carbamate-functional crosslinking agent;
   (c) incorporating the carbamate-functional crosslinking agent into an aqueous coating composition comprising at least one resin having at least two carbamate-reactive moieties and a plurality of acid-salted amine groups;
   (d) electrically depositing a coating onto a conductive article immersed in the aqueous coating composition;
   (e) removing the coated article from the coating composition; and
   (f) curing the deposited coating to form a crosslinked film.

2. A process according to claim 1, wherein the carbamate-functional crosslinking agent has from 4 to 8 carbamate groups.

3. A process according to claim 1, wherein the carbamate-functional crosslinking agent has from 4 to 6 carbamate groups.

4. A process according to claim 1, wherein the carbamate-functional crosslinking agent has 4 carbamate groups.

5. A process according to claim 1, wherein the epoxide-reactive group is selected from secondary amine, carboxylic acid, and phenol hydroxyl groups.

6. A process according to claim 5, wherein the epoxide-reactive group is a secondary amine.

7. A process according to claim 1, wherein the polyamine is a polyalkylene polyamine.

8. A process according to claim 1, wherein the polyamine is selected from the group consisting of diethylenetriamine, triethylenetetramine, tetraethylenepentamine, dipropylenetriamine, and mixtures thereof.

9. A process according to claim 1, wherein the polyamine has a molecular weight of from about 75 to about 400.

10. A process according to claim 1, wherein the cyclic carbonate comprises a five-member ring.

11. A process according to claim 1, wherein the cyclic carbonate is selected from the group consisting of ethylene carbonate and propylene carbonate.

12. A process according to claim 1, wherein the polyepoxide compound has from about 2 to about 4 epoxide groups per molecule on average.

13. A process according to claim 1, wherein the polyepoxide compound is a polyglycidyl ether of a polyol.

14. A process according to claim 1, wherein the polyepoxide compound is a polyglycidyl ether of a polyphenol.

15. A process according to claim 1, wherein the polyepoxide compound has an epoxide equivalent weight of from about 50 to about 500.

16. A process according to claim 1, wherein the polyepoxide compound is an epoxy novolac resin.

17. A process according to claim 1, wherein the polyepoxide compound comprises the glycidyl ether of bisphenol A.

18. A process according to claim 1, wherein the aqueous coating composition further comprises an aliphatic urea crosslinking agent.

19. A process according to claim 18, wherein said aliphatic urea crosslinking agent comprises the reaction product of an aliphatic diisocyanate and an aliphatic secondary amine.

20. A process according to claim 18, wherein the aqueous coating composition has a weight ratio of aliphatic urea crosslinking agent to the carbamate-functional crosslinking agent of from at least about 25:75, to about 75:25.

21. A process according to claim 20, wherein the weight ratio of the aliphatic urea crosslinking agent to carbamate-functional crosslinking agent is at least about 50:50.

22. A process according to claim 1, wherein the resin of step (c) is an epoxy resin.

23. A process according to claim 22, wherein the resin of step (c) comprises a polyglycidyl ether of a polyphenol extended with an extender selected from the group consisting of polyphenols, polyamines, and ethoxylated polyamines.

24. A process according to claim 1, wherein the resin of step (c) has from about 2 to about 4 acid-salted primary amine groups on average per molecule.

25. A process according to claim 1, wherein the composition comprises from about 10 to about 45% by weight crosslinking agent, based upon total weight of nonvolatiles.

26. A process according to claim 1, wherein the carbamate-reactive moieties of the principal resin are selected from the group consisting of primary amine, secondary amine, hydroxyl groups, and mixtures thereof.

27. A process according to claim 1, wherein the carbamate-reactive moieties of the principal resin are hydroxyl groups.

* * * * *